Sept. 11, 1951  H. P. RANSBURG  2,567,781
METHOD FOR COATING ARTICLES
Filed April 23, 1945  2 Sheets-Sheet 1
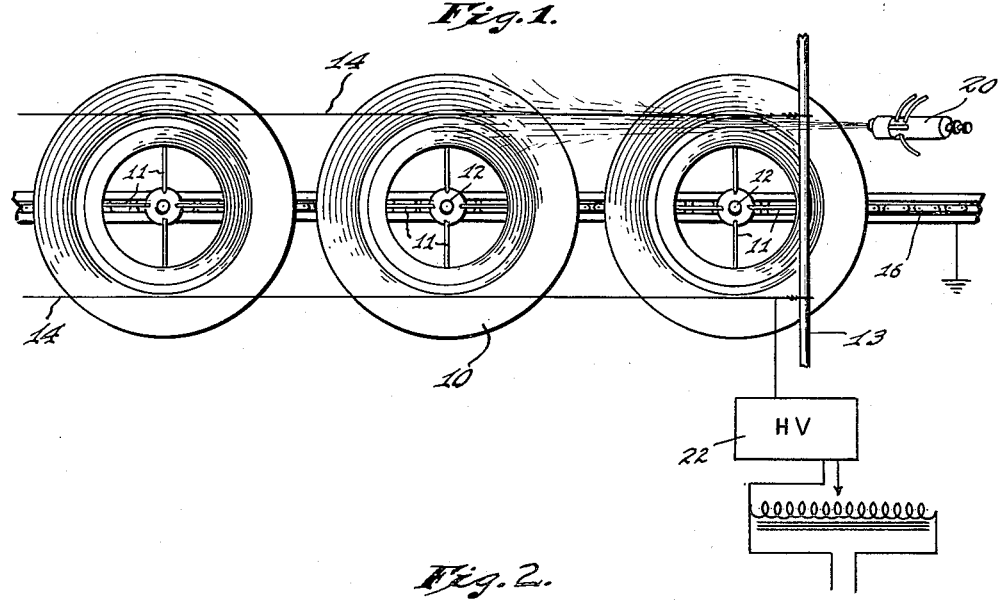
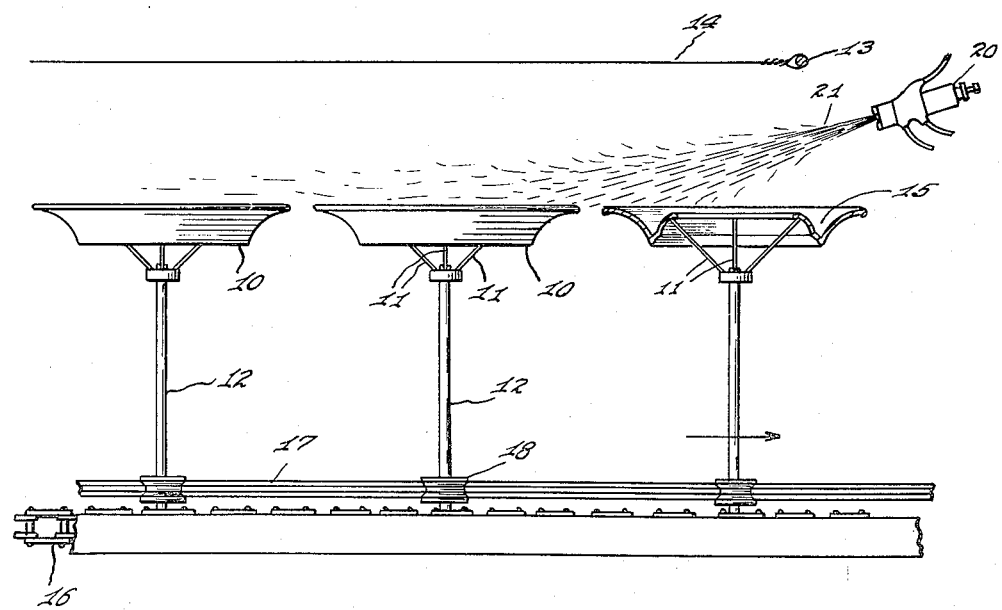
INVENTOR.
HAROLD P. RANSBURG,
BY
ATTORNEYS.

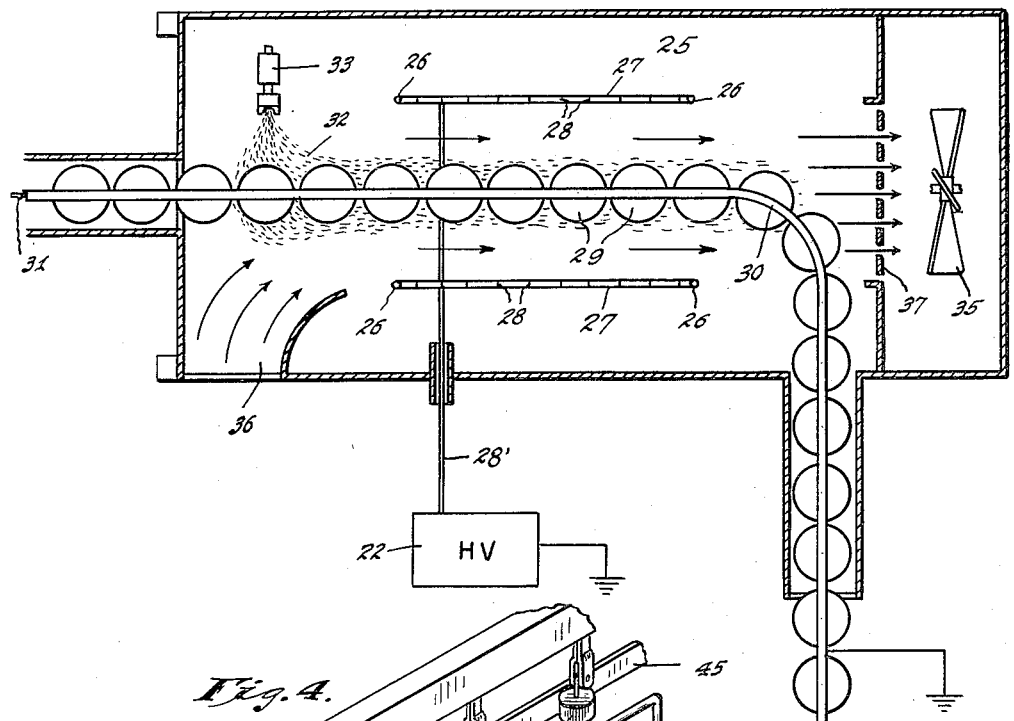
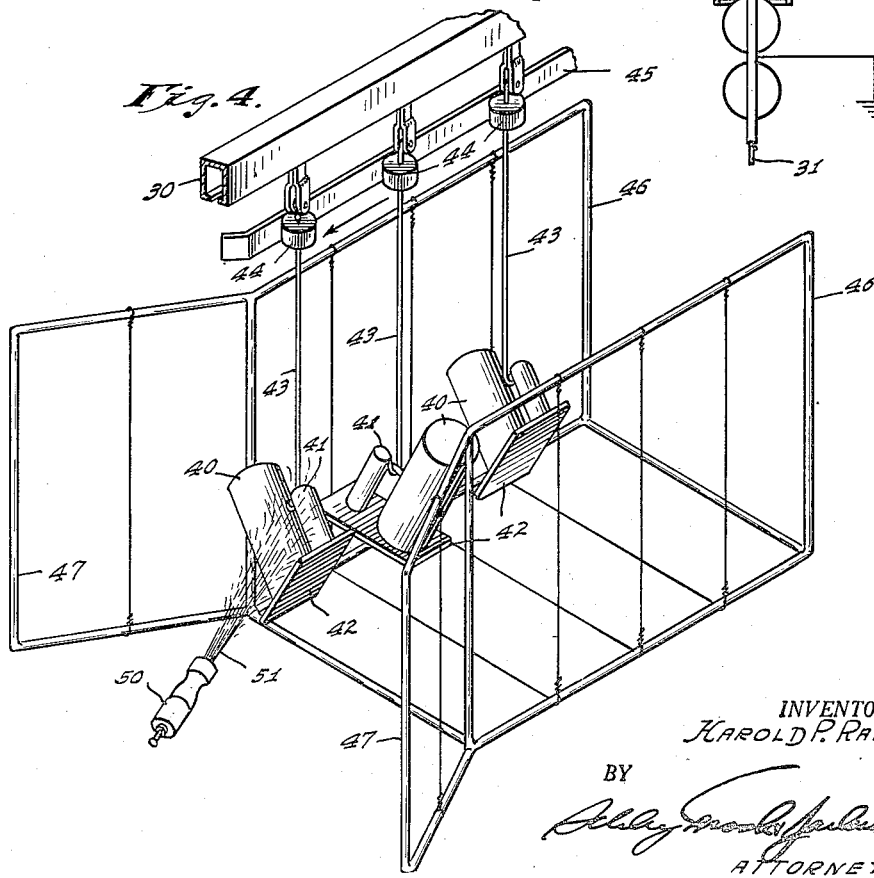

Patented Sept. 11, 1951

2,567,781

UNITED STATES PATENT OFFICE 2,567,781

METHOD FOR COATING ARTICLES

Harold P. Ransburg, Indianapolis, Ind., assignor, by direct and mesne assignments, to Ransburg Electro-Coating Corp., Indianapolis, Ind., a corporation of Indiana Application April 23, 1945, Serial No. 589,719

1 Claim. (Cl. 117—93)

This invention relates to the application of a coating to an article supported in an electrostatic field under conditions such that finely divided coating material, more or less suspended in the surrounding atmosphere, will be attracted to and deposited upon the article. This general process of applying coatings is well known, one exemplification of it being found in U. S. Letters Patent No. 2,247,963, issued July 1, 1941.

In such electrostatic coating processes as generally practiced, the article to be coated is supported in spaced relation to a discharge electrode between which and the article a substantial potential difference is maintained to create an electrostatic field. The coating material is atomized by and carried in an air jet directed into the field. The finely divided particles of coating material acquire an electrical charge from the discharge electrode, and thus are attracted to and precipitated upon the oppositely charged article. Any air in the jet which strikes the article would necessarily be displaced by the air following it in the jet; and the displaced air would tend to carry away from the article particles attracted to it by the effect of the field. If the particles thus carried away have approached sufficiently close to the article to lose their original charge and acquire an opposite charge from the article, the electrostatic field would cause them to be repelled from the article. Accordingly, the aim in well-engineered electrostatic coating processes has been to avoid as far as possible any direct and violent impact on the article of the air-jet carrying the subdivided coating material. Expressed in other words, the desideratum was considered to be the production of an atmosphere containing uniformly distributed, electrically charged particles through which moved the articles to be coated, the articles being charged oppositely to the particles and conditions being such that particle movement and precipitation resulted solely from the effect of the electrostatic field. That desideratum could never be completely attained in practice; but by making the strength of the field as great as possible consistent with safety from sparking and by introducing the coating particles at as low a velocity as possible consistent with the necessary degree of subdivision, the conditions considered most desirable could be approached. Spray guns used to introduce the coating material into the field were so located and directed that they would be at a considerable distance from any article directly in line with them, in order that the initial momentum of the spray particles and the air stream conveying them would be largely lost before the particles impinged upon the article. A plurality of guns operating at low pressure, instead of a single high-pressure gun, were used to reduce initial velocities.

Practiced as above described, the spray-coating process operated very satisfactorily for the coating of flat sheets, cylinders, and the like where the distribution of the electrostatic field over the surface of the article was reasonably uniform. However, since it is an inherent tendency of the electrostatic field to precipitate the finely divided coating material most heavily on surface-portions over which the field-strength is greatest, and since field-strength is always relatively low over depressed or re-entrant surface portions, electrostatic deposition tends to produce an uneven distribution of coating material on the surfaces of irregularly shaped objects. In some cases it is possible to improve the distribution of coating material by promoting uniformity of field-strength over all surface-portions of the article, as through the use of specially shaped charging electrodes in the manner taught by my copending application Serial No. 519,332, filed January 22, 1944, now Patent No. 2,428,991, or through the use of auxiliary electrodes as disclosed in the copending application of William A. Starkey, Serial No. 519,333, filed January 22, 1944, now Patent No. 2,425,652. I have found, however, that the shape of an article to be coated may be such that it is a practical impossibility to obtain, especially under production conditions, a field distribution sufficiently uniform to result in a satisfactory coating. Deep pockets, grooves, or other electrically shielded re-entrant portions may therefore be substantially uncoated, especially if they are defined by relatively sharp edges or are located adjacent projections or protuberances.

I have discovered that this difficulty in coating a re-entrant surface portion can be overcome in some instances by deliberately departing from prior practice and directing at it a high-velocity jet containing the finely subdivided coating material. However, there is a practical limit to any benefits to be obtained in this manner. In the first place, the progressive displacement of air from an article upon which a jet impinges tends to carry away from the article particles of coating material which would otherwise be deposited thereon as a result of the electrostatic field. In the second place, the re-entrant surface portion tends to trap the air forced into it and to cause the formation of a relatively static air cushion which retards the jet. As the particles lose their momentum upon striking such cushion, the electrostatic field deflects them from their original course, which would carry them to the shielded bottom of the re-entrant portion, and causes them to be deposited on the shielding portion or portions. When a recess is relatively deep, even a jet possessing the highest practicable velocity will not cause a deposition of coating material particles on the recess bottom when the impingement of the jet upon the article occurs in a region where the average field-strength over the surface is of the order customarily maintained in electrostatic coating processes.

Where, as a result of the shape of an article, the electrostatic coating process results in an unsatisfactory coating distribution, it would of course be possible to fortify the thinly coated portions with additional coating material applied in any convenient manner outside the electrostatic field. Such a two-step process would be relatively expensive, however. In some instances the added cost of coating re-entrant portions in a separate operation outside the field would more than offset the saving which would result from the use of electrostatic deposition in coating those portions of the article-surface which could be satisfactorily coated electrostatically.

It is the object of my invention to produce a process and apparatus by the use of which the benefits of electrostatic coating can at least in large measure be obtained in the coating of articles whose shape is so irregular that the distribution of an electrostatic field over their surfaces is markedly non-uniform. A further object of my invention is to produce such a process and apparatus which will be adaptable for use in quantity production methods and which will not require the use of auxiliary or specially shaped discharge electrodes.

In carrying out my invention in its preferred form I provide a conveyor by which the articles to be coated are successively moved through a region in which they are associated with a discharge electrode spaced from them. A substantial electrical potential difference is established between the electrode and the articles passing it, with the result that an electrostatic field is created over the surfaces of the articles. As the distance between each article and the electrode varies while the article is approaching, passing, and receding from the electrode, the average field strength over the article surface successively increases, remains substantially constant, and decreases. Also, except for the effect of changes in orientation of the article relative to the electrode, the field strength at any one point on the surface of the article likewise increases, remains constant, and decreases as the articles move toward, past, and away from the electrode.

I introduce the coating material in the form of a jet or spray containing the coating material in finely divided condition. The outer portion of such a jet is in contact with the more or less quiescent surrounding atmosphere, and hence is subject to friction tending to reduce its velocity, while the inner portion of the jet is protected by the outer portion from contact with the surrounding atmosphere and from the friction exerted thereby. As a result, at a distance from the jet-forming device the particles of coating material near the center of the jet will possess a higher velocity than those at the outside of the jet.

The spray-gun used to form the jet of coating material is spaced from the electrode at one side of the path of article travel and arranged so that the moving articles will pass through the jet with their electrically shielded portions in position to receive directly the higher-velocity particles comprised in the jet. To facilitate description, I designate as the "impingement region" that region in which the higher-velocity particles in the jet strike the article. To prevent undue distortion of the path followed by such higher-velocity particles as a result of the influence of localized high field-strength about the opening into the re-entrant portions, I control the average field strength over the entire surface of the article when such article is in the impingement region. I have found that the tendency of coating particles to be attracted toward the high, or shielding, portions of an article-surface and away from re-entrant, or shielded, portions may be reduced by reducing such average field-strength. As the average field strength over the surface of an article in the impingement region depends upon two factors—namely, the distance between the charging electrode and the impingement region and the potential difference maintained between the charging electrode and the articles to be coated—I can obtain the desired reduction in average field-strength either by increasing the spacing of the electrode from the impingement region or by reducing the potential difference between the discharge electrode and the articles to be coated.

In the manner just described the higher velocity particles are precipitated on to the re-entrant surface portions of the article as a result of the momentum initially imparted to them combined with the effect of the reduced electrostatic field over the entire surface of the article. If it were not for the presence of the lower-velocity particles in the jet and for the effect of the electrostatic field on such particles, only the re-entrant portions of the article surface would be coated. However, the effect of the electrostatic field on the lower velocity particles causes them to be attracted to the article and precipitated on the other surface portions thereof in a satisfactorily uniform distribution. In other words, the momenta of all particles is caused to combine with the effect of the electrostatic field in such a way as to produce a substantially uniform resultant precipitating effect over the entire surface of the article, including the re-entrant portion.

The accompanying drawings illustrate my invention: Fig. 1 is a fragmental plan and Fig. 2 a fragmental elevation illustrating an embodiment of my invention in which the spray is discharged into the field and the strength of the field in the impingement region is controlled by controlling the potential difference between the electrode and the articles to be coated; Fig. 3 is a plan view, somewhat diagrammatic in character, illustrating apparatus in which the desired reduction in field strength is obtained as a result of the relative location of the impingement region and the charging electrode; and Fig. 4 is an isometric view illustrating a further modification.

In the apparatus illustrated in Fig. 1, ring-like articles 10 of sheet metal, supported through spiders 11 from rotatable spindles 12, are conveyed past and beneath a discharge electrode comprising end members 13 between which a plurality of fine electrode wires 14 extend. The articles 10 are formed with re-entrant portions in the form of relatively deep V-shaped, annular grooves 15. The spindles 12 are mounted upon a suitable conveyor chain 16; and means, such as a bar 17 co-operating with rollers 18 rigid with the respective spindles, are provided to cause the spindles to rotate as they pass beneath the wires 14. Near that end of the discharge-electrode from which the articles 10 emerge, I mount a spray gun 20 producing a jet 21 which successively impinges on the articles 10 as they pass beneath the electrode wires 14. A high-voltage source 22, one terminal of which is connected to the electrode 13—14 and the other terminal of which is grounded, is used to maintain the high-voltage field between the electrode and the articles 10, which are grounded through the conveyor supporting them.

With the arrangement illustrated in Fig. 1, I have found it to be a practical impossibility to obtain a satisfactory coating of the bottoms of the grooves 15 if the potential difference maintained between the articles 10 and the electrode 13—14 is such as is ordinarily used—i. e., such as will result in an average field-strength over the surface of the article of 10,000–15,000 volts per inch. This is true even if the velocity of the jet is increased far beyond any customarily employed in electrostatic deposition processes. The reason for the inadequate coating of the groove-bottom is that the electrostatic field is not of uniform intensity over the surface of each article 10 but instead is much higher than the average near the upper edges of the groove 15, and much lower than the average over the groove-bottom. In other words, the upper portions of the walls of the groove 15, being relatively sharp edged and being relatively close to the electrode wires, have a local electrical field whose strength is of the order of 20,000–25,000 volts per inch and hence act to rob the groove-bottom of its coating material. In consequence, the spray-particles entering the electrostatic field from the gun 20, will be attracted toward and deposited upon the upper portions of the walls of the groove 15 where the electrostatic field is at its greatest strength. Few, if any, particles will pass through this stronger portion of the field and find their way to the bottom of the groove 15.

I have discovered, however, that by properly coordinating three factors—namely, the character and direction of the jet 21, the potential difference maintained between the electrode 13—14 and the articles 10, and the path followed by such articles—it is possible to obtain substantially uniform distribution of coating material over the entire outer surface of each article. To accomplish this result, I depart from conditions previously deemed desirable in the application of electrostatically-deposited coatings and arrange the gun 20 so that at least part of the higher-velocity portion of the jet discharged therefrom will strike the article 10 while a considerable portion of its initial momentum is still retained, and by reducing the potential difference between the articles 10 and the electrode 13—14 I reduce the average value of the electrostatic field over the surface of the articles 10 to a value such that the higher-velocity particles discharged from the gun 20 will be able to overcome the reduced (although still relatively strong) electrostatic field at the edges of the groove 15 and pass therethrough to the bottom of such groove.

In the case of the specific articles illustrated in Figs. 1 and 2, which are approximately 24 inches in diameter and shown approximately to scale, the jet discharged from the spray gun 20 would be of generally elliptical cross-section with its minor axis disposed horizontally and its major axis disposed in a vertical plane such that the higher velocity part of the jet pattern would strike the groove-bottoms approximately tangentially. The preferred spacing between the electrode 13 and the articles 10 in this case would be approximately 15 inches. For most satisfactory operation in this case I have found the voltage between the electrode 13 and the article 10 to be approximately 70,000 volts.

In standard electrostatic coating practice the voltage at the same spacing would be approximately 125,000 volts and the gun would be arranged so that its elliptically shaped jet would have its major axis horizontal and would be so directed as to spray approximately horizontally in a direction parallel to the electrode. In addition a plurality of guns would be used in order to obtain at low velocity the required amount of atomized material.

The apparatus illustrated in Fig. 3 was originally disclosed in my co-pending application Serial No. 574,721, filed January 26, 1945, now Patent 2,442,986, of which this application is a continuation-in-part. Such apparatus includes a booth 25 of any convenient form. Insulators 26 support within the booth a pair of spaced electrode-frames 27 each of which supports a series of spaced, relatively small electrode wires 28 connected through a conductor 28' with one terminal of the high-voltage source 22. The opposed electrode frames 27 are so spaced as to permit the articles 29 being coated to pass between them in a path spaced from each of them by a distance desirably somewhat greater than the spacing of the electrode-wires 28.

The articles 29 to be coated are supported in series and in spaced relation to each other from an overhead conveyor track 30 along which they are moved by a chain 31. The conveyor system is grounded, as is also one terminal of the high-voltage source 22. As a result, there is created between the electrode-wires 28 and the articles passing through the booth a high-potential electrical field of a character such as will effect the electrostatic deposition on the articles of any coating-material particles introduced into the field. The conveyor system desirably has associated with it some means such, for example, as the roller and bar arrangement illustrated in Figs. 1 and 2, which will cause the articles 29 to be rotated as they pass through the booth 25 and especially through that portion thereof located in advance of and between the electrode-frames 27.

As will be clear from Fig. 3 the articles 29 pass through the booth 25 from left to right. The electrode-frames 27 are spaced from the left-hand end of the booth, with the result that articles entering the booth move for a distance therein before entering the space directly between them. As the articles 29 move over this portion of their path, in which the average electrostatic field over their respective surfaces is increasing, they pass through an impingement region in which they are struck by a jet 32 from a spray gun 33 which is arranged to discharge substantially normal to the path followed by the articles 29. As will be obvious, the average strength of the electrostatic field over the surface of an article in the impingement region will be materially lower than the average field-strength over the surface of an article in the region between the electrode-frames 27. Accordingly, if the gun 33 is so disposed that the jet 32 is directed toward the re-entrant portions of the surfaces of the articles 29, particles of the coating material will enter and coat those re-entrant surface-portions and will not be deflected therefrom by the influence of any localized fields of high strength about their peripheries. Because of the necessity for coating the re-entrant areas in a region where average field-strength is low, many of the particles of coating material will either pass between articles 29 or rebound or otherwise be carried away from the surfaces of such articles and be lost. To prevent such loss, I mount at the right-hand end of the booth 25 a suction fan 35 which draws air into the booth through an opening 36 in the wall toward which the gun 33 discharges and causes such air to pass longitudinally of the booth between the electrode-frames 27. If desired, a foraminous screen 37 may be located adjacent the fan 35 to intercept any coating-material particles which are still present in the air stream. The over-spray or rebounding particles will be picked up by the air stream entering the opening 36 and will be conveyed in such stream longitudinally of the booth between the electrode-frames 27. Over the surface of an article in this region, the average strength of the electrostatic field will be materially greater than in the impingement region and will be large enough to precipitate these slowly moving particles on to those areas of the article not coated in the impingement region. Uniform coverage can thus be obtained in a single operation and with the advantages of electrostatic coating despite irregularity of article-shape.

The apparatus illustrated in Fig. 4 shows another modification of my invention as employed in coating articles each of which comprises a pair of cylinders 40 and 41 secured in closely spaced relation to a base 42. Such articles, supported through hangers 43 of conducting material, are moved over a predetermined path by a conveyor system including the track 30 and chain 31 previously described. Each of the hangers 43 is pivotally connected to the chain 31 and is rigid with a roller 44 which bears frictionally on a stationary rotator bar 45. By this means, each of the articles to be coated is caused to rotate about a vertical axis as it proceeds along the path determined by the track 30. Mounted adjacent the path followed by the articles I provide a discharge electrode having two parallel portions 46 located on opposite sides of the article-path and two portions 47 which are respectively continuous with the portions 46 but which diverge from each other in the direction of article-travel.

In the article illustrated in Fig. 4, the adjacent portions of the surfaces of the cylinders 40 and 41 will in effect constitute a re-entrant area and will be electrically shielded by the remaining portions of such cylinders. As a result, such adjacent surface portions cannot be effectively coated electrostatically under the practice followed prior to my invention. To obtain the maximum benefits of electrostatic coating while still making it possible to coat the shielded or re-entrant portions of the surface, I arrange a spray-gun 50 so that the higher-velocity particles in the jet 51 which it forms will enter the space between the cylinders 40 and 41 of an article located between the diverging portions 47 of the discharge electrode. The spray gun 50 is arranged to discharge at an acute angle to the path of travel of articles passing through the electrode, with the result that the over-spray will be carried into the region between the parallel electrode-portions 46.

The potential difference maintained between the electrode 46—47 and the articles coated will be as great as possible consistent with safety from sparking in the region between the parallel electrode-portions 46. Accordingly, the electrostatic deposition of the over-spray will be very effective. On the other hand, because of the divergence of the electrode-portions 47, the average electrostatic field over the surface of the article in the impingement region will be relatively weak. Because of this weakness of the average field in the impingement region, the higher-velocity particles in the jet will be able to enter the space between the cylinders 40 and 41 and will not be deflected from such space by the localized field of high strength which exists over those portions of the cylinders 40 and 41 which electrically shield the space between them.

Spray-guns of the type used in creating the jet in the practice of my invention are susceptible to adjustment or modification by which the cross-sectional shape of the jet may be controlled. For example, the jet produced may be circular, elliptical, or shaped somewhat like a figure 8 in cross-section. It is desirable of course, to employ a jet whose cross-sectional shape will approximate the shape of the re-entrant surface-portion as projected toward the jet-source. By this means, the higher-velocity particles within the jet will be concentrated in the region of the re-entrant surface-portion of the article being coated. The over-spray, which comprises coating material particles which either rebound from the surface of the article being coated or which are so directed that they would not strike the re-entrant portion, is within the influence of the electrostatic field, and will tend to be deposited on the article as a result of the influence of such field. In the arrangement illustrated in Fig. 3, where the impingement region is located at a point where the strength of the field is relatively low, the air stream induced by the fan 35 will move the over-spray into portions of the field where the strength is greater. In the arrangements illustrated respectively in Figs. 1 and 2 and in Fig. 4, the jet is discharged at an acute angle to the path of article-travel within the electrode, and consequently the component of article-velocity normal to the path of particle-travel is relatively small. As a result, the particles will remain within the field for a sufficiently long time to enable the field to effect their precipitation upon articles which have not yet moved into the impingement region.

In all modifications of the invention shown, the coating-material particles of greatest velocity within the jet impinge upon re-entrant surface portions of the article to be coated under conditions such that the average strength of the electrostatic field over the entire surface of the article is materially lower than that existing or deemed desirable in electrostatic coating methods as previously practiced. In the apparatus of Figs. 1 and 2, the reduction in average field-strength is obtained by reducing the potential difference between the charging electrode and the articles well below that which prior practice would involve. In Fig. 3, the reduction in average field strength is obtained by locating the impingement region beyond the limits of electrodes but still close enough thereto to result in the creation of a field over the surface of the article upon which the jet impinges. In Fig. 4, the average field-strength over the surface of an article in the impingement region is reduced by increasing the spacing of the electrodes opposite the impingement region. In all arrangements, the electrostatic field is effective to cause electrostatic precipitation of the over-spray on to those surface portions other than re-entrant portions.

While I have shown only one spray gun in each of the illustrated embodiments of my invention, the coating of certain articles, especially large articles or articles having more than one re-entrant portion, may require the use of one or more additional guns. However, as I employ jet velocities much higher than those heretofore used I can introduce the requisite amount of coating material with fewer guns than have previously been deemed necessary.

It is characteristic of my process that an article passed through the coating apparatus when no potential difference is maintained between it and the discharge electrode will be adequately coated only over the re-entrant and adjacent areas. The overspray, which contains enough coating material to coat the remainder of the article adequately, is carried away from the article and lost. However, when the electrostatic field is maintained the coating material in the overspray is precipitated as above described and is not lost.

It is to be realized that re-entrant portions, in the sense in which I have used that term, may exist as a result of the manner in which the articles are supported during the coating operation. Thus a portion of an article may be electrically shielded by the support upon which it is mounted or by another article carried by the same support, so that the combination of article (or articles) and support may be regarded as possessing one or more re-entrant portions. Also it is to be noted that where a succession of articles are being coated the electrostatic precipitation of overspray is equally effective whether it occurs on an article in the impingement region or on one or more of the other articles.

I claim as my invention:

A process of electrostatically coating articles having re-entrant surface portions, comprising passing the articles in a series over a predetermined path through a coating zone, maintaining over the surfaces of articles in the coating zone an electrostatic field having an extended region of relatively high intensity and a second region of relatively low intensity, forming a jet of particled coating material, directing said jet in fixed relation to the article-path to impinge on the re-entrant surface portion of each article while the article is in the field-region of low intensity, and creating a current of air flowing through the coating zone from the field-region of low intensity to and through the region of high field-intensity, whereby particles of coating material not deposited on said article under the joint effect of their momentum and the low-intensity field will be carried by said air stream into the high-intensity field region for deposit there on the surfaces of other articles of the series.

HAROLD P. RANSBURG.

REFERENCES CITED

The following references are of record in the file of this patent:

UNITED STATES PATENTS

| Number | Name | Date |
|---|---|---|
| 2,247,963 | Ransburg et al. | July 1, 1941 |
| 2,334,648 | Ransburg et al. | Nov. 16, 1943 |
| 2,442,986 | Ransburg | June 8, 1948 |